United States Patent [19]
Yoshida et al.

[11] Patent Number: 5,446,755
[45] Date of Patent: Aug. 29, 1995

[54] LASER ABLATION APPARATUS

[75] Inventors: Yoshikazu Yoshida; Shinichi Mizuguchi, both of Osaka, Japan

[73] Assignee: Matsushita Electric Industrial Co., Ltd., Osaka, Japan

[21] Appl. No.: 350,734

[22] Filed: Dec. 7, 1994

Related U.S. Application Data

[63] Continuation-in-part of Ser. No. 200,524, Feb. 23, 1994, abandoned.

[30] Foreign Application Priority Data

Feb. 24, 1993 [JP] Japan .................................. 5-35101

[51] Int. Cl.6 .................................................. H01S 3/00
[52] U.S. Cl. .................................... 372/109; 356/381
[58] Field of Search ................ 372/108, 109; 356/381; 340/173 LM

[56] References Cited

U.S. PATENT DOCUMENTS 3,654,624  4/1972  Becker et al. ............... 340/173 LM
4,676,646  6/1987  Strand et al. ..................... 356/381
5,018,164  5/1991  Brewer et al. ....................... 372/109

OTHER PUBLICATIONS

Machines and Tools, "Practical Success of Ceramics Deposition Apparatus by the Use of Laser" by A. Ohmine; Jul. 1990.

Primary Examiner—Leon Scott, Jr.
Attorney, Agent, or Firm—Wenderoth, Lind & Ponack

[57] ABSTRACT

A laser ablation apparatus includes a laser oscillator, a condenser lens for condensing a laser light generated from the oscillator, a rotary cylindrical target having a side face which is illuminated by the laser light, a driving device for rotating the target, a substrate carrier device for moving a substrate in a direction parallel to a tangential direction of the cylindrical target, and a vacuum chamber located above the substrate. The vacuum chamber encloses a part of the cylindrical target, and has an open laser inlet port so that the side face of the target is illuminated by the laser light passing through the laser inlet port to adhere material evaporated from the target to the substrate when the substrate passing through the vacuum chamber.

5 Claims, 4 Drawing Sheets

LASER ABLATION APPARATUS

This application is a continuation-in-part of now abandoned application, Ser. No. 08/200,524, filed Feb. 23, 1994.

BACKGROUND OF THE INVENTION

The present invention relates to a laser ablation apparatus which is used to form a film of a compound utilized for a thin film device.

A conventional laser ablation apparatus (disclosed in "PRACTICAL SUCCESS OF CERAMICS DEPOSITION APPARATUS BY THE USE OF LASER" in "Machines and Tools" by Atsushi Ohmine, issued on July 1990, pages 2–6) will be depicted hereinbelow with reference to FIG. 7.

In the conventional laser ablation apparatus of FIG. 7, when a laser light 22 of an energy density not smaller than a threshold value is cast to a rotary cylindrical target 21 in vacuum chamber 26, a material 23 that flies from the target 21 is adhered to a substrate 24. The laser light used is generally a pulse laser light of a short wavelength. The laser light 22 is projected to the target 21 through a sealed window 25 after being condensed to a high energy density. The substrate 24 is disposed inside the vacuum chamber 26.

In the aforementioned prior art, when a film is to be formed on a large-area substrate, it is necessary to move the substrate 24 because of the fact that an evaporation spot is small, and a vacuum chamber of a size not smaller than four times the substrate is needed. Moreover, since the evaporated particles adhere to the window 25, the laser power is decreased on the target 21.

SUMMARY OF THE INVENTION

An essential object of the present invention is therefore to provide a laser ablation apparatus which can project a laser light between a substrate capable of being continuously transported and a rotary cylindrical target a part of or the whole of which is enclosed by a vacuum chamber of a differential evacuating system.

In accomplishing this object, according to one aspect of the present invention, there is provided a laser ablation apparatus comprising: a laser oscillator; a condenser lens for condensing a laser light generated from the oscillator; a rotary cylindrical target a side face of which is illuminated by the laser light; a driving device for rotating the target; a substrate carrier device for moving a substrate in a direction parallel to a tangential direction of the cylindrical target; and a vacuum chamber located above the substrate, enclosing a part of the cylindrical target, and having an open laser inlet port so that the side face of the target is illuminated by the laser light passed through the laser inlet port to adhere material evaporated from the target to the substrate when the substrate passes through the vacuum chamber.

BRIEF DESCRIPTION OF THE DRAWINGS

The above object and features of the present invention will become clear from the following description taken in conjunction with one preferred embodiment thereof and with reference to the accompanying drawings, in which.

DETAILED DESCRIPTION OF THE PREFERRED EMBODIMENT

Figure 1:
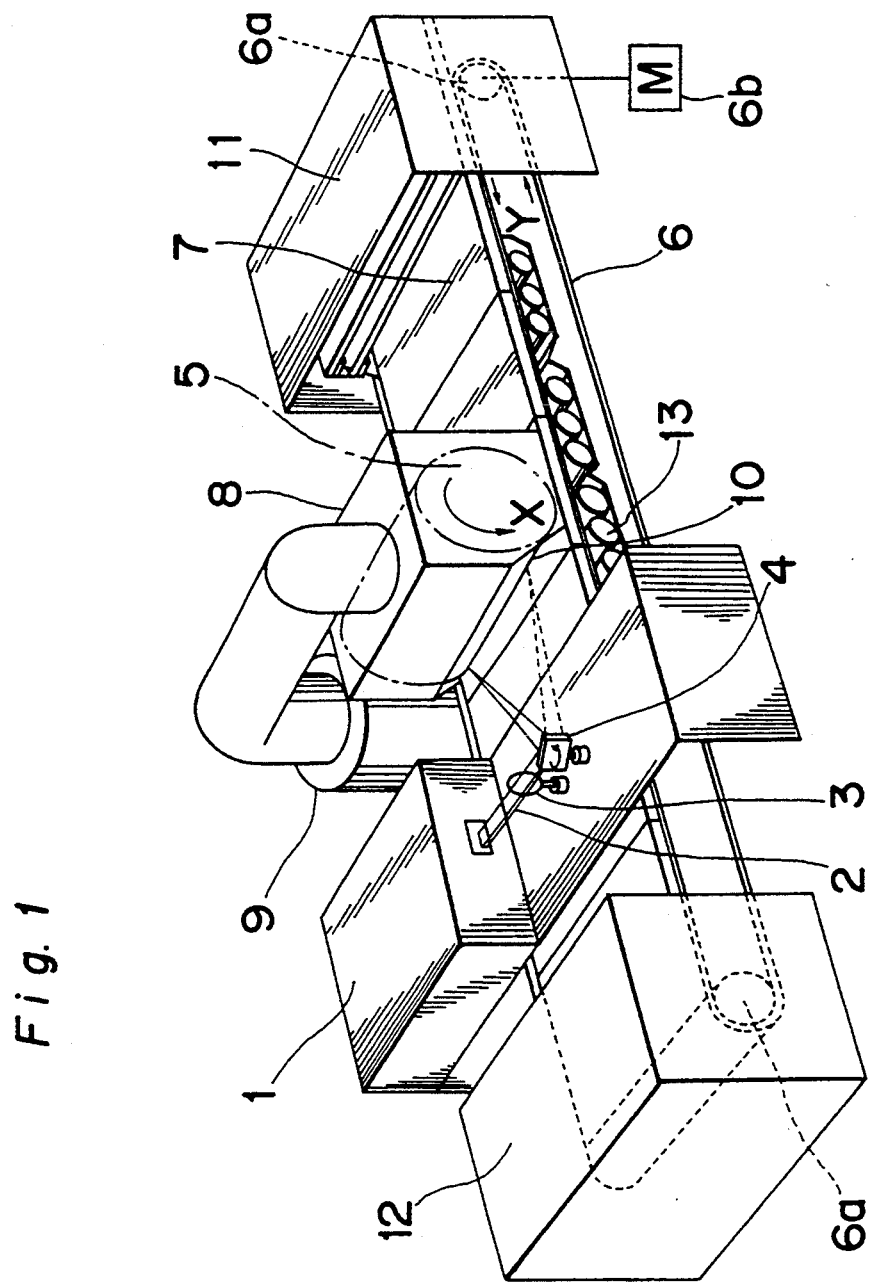
FIG. 1 is a perspective view of a laser ablation apparatus according to an embodiment of the present invention.

Before the description of the present invention proceeds, it is to be noted that like parts are designated by like reference numerals throughout the accompanying drawings.

A laser ablation apparatus according to a preferred embodiment of the present invention will be discussed with reference to the accompanying drawings.

Figure 2:
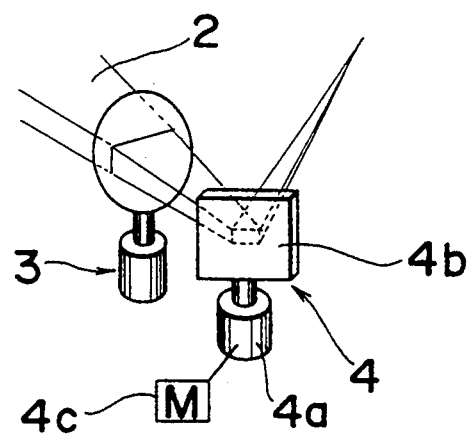
FIG. 2 is a perspective view showing a lens and a galvano mirror of FIG. 1.
Figure 4:
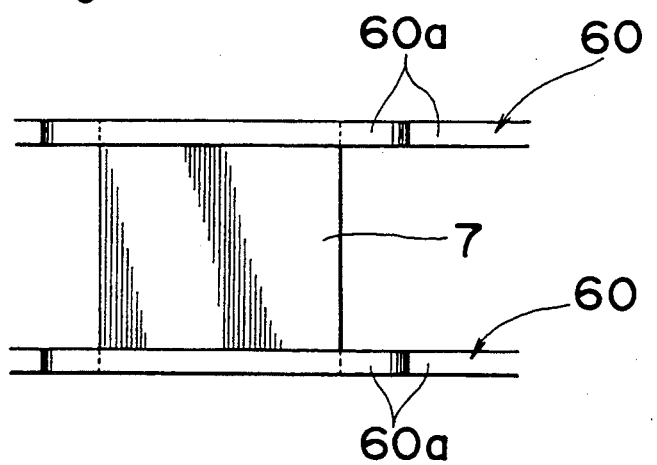
FIGS. 4 and 5 are a plan view and a side view showing a part of a chain carrier system of the apparatus.
Figure 5:
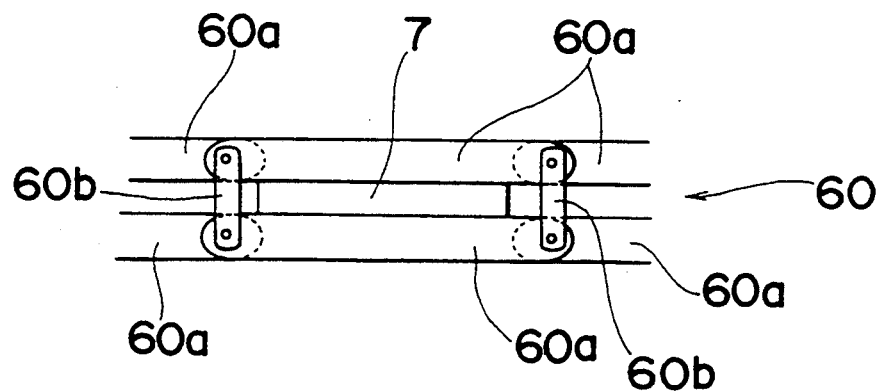
Figure 3:
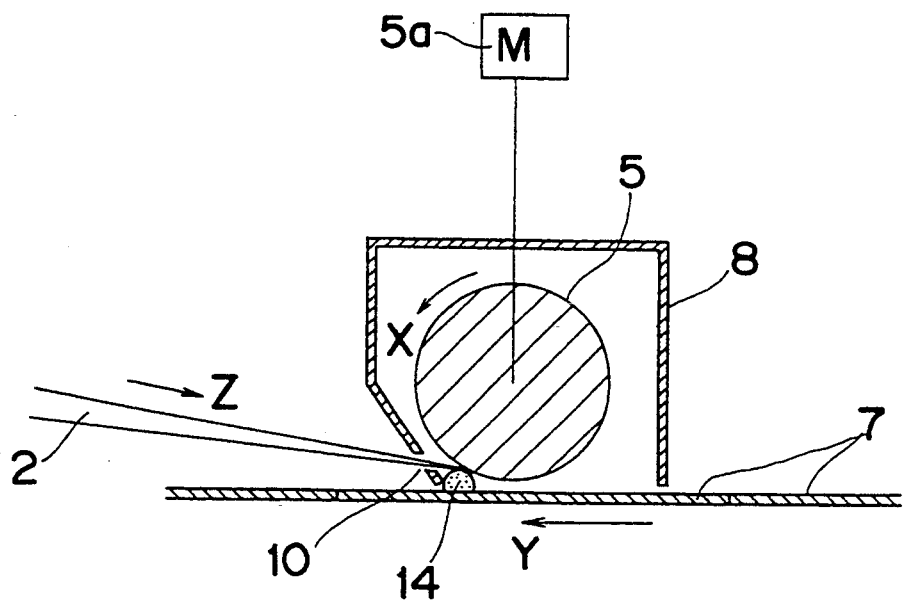
FIG. 3 is a sectional view of the laser ablation apparatus of the embodiment.

Referring to FIG. 1, an ablation laser light 2 oscillated, for example, from a laser oscillator, e.g. a pulse laser such as an excimer laser 1, is condensed by a lens 3, reflected by a galvano mirror 4, and projected to the side face of a cylindrical target 5. The cylindrical target 5 is rotated in an X direction by a driving motor 5a (FIG. 3). A mirror 4b of the galvano mirror 4 is rotated on its base 4a within a specified angle by a driving motor 4c as shown in FIG. 2. Substrates 7 held on a chain carrier system 6 are moved in a Y direction below the target 5. The chain carrier system 6 has a pair of chains 60 each consisting of two chain elements 60a connected to each other by arms 60b so as to hold each substrate 7 between the chain elements 60a, as shown in FIGS. 4 and 5. The pair of chains 60 is driven by sprockets 6a with a driving motor 6b. A vacuum chamber 8 covers the cylindrical target 5 while maintaining a distance, e.g. 2 mm, above the substrate 7. An evacuating pump such as an oil diffusion pump 9, is mounted to the vacuum chamber 8, and an inlet slit 10 for the laser light 2 is opened in the vacuum chamber 8. Each substrate 7 is carried onto the chain carrier system 6 from a stocker 11, passes below the cylindrical target 5, and is finally stored in another stocker 12 after a film is formed thereon. A substrate heating lamp 13 for heating the substrates 7 is set between the upper and lower driving parts of the chain carrier system 6.

In the structure as above, the laser light 2, having, e.g., a 248 nm wavelength and a 27 nsec pulse width, is condensed to, for instance, a 2 mm×3 mm spot at the side face of the cylindrical target 5 by the lens 3 and scanned 200 mm or so in a direction parallel to the moving direction of the substrate 7 by the rotation of the galvano mirror 4. Indium Kappa selenium (InCuSe$_3$) or the like is attached to the side face of the cylindrical target 5. As shown in FIG. 3, the material of the cylindrical target 5, beaten away by the laser light 2 passing through the inlet slit 10, flies to the substrate 7, thereby forming a compound thin film of indium and Kappa selenium. At this time, supposing that the vacuum chamber 8 is 300 mm×200 mm×150 mm and vacuumized by the oil diffusion pump 9 with 130 μ/sec effective evacuating rate through the 220 mm×4 mm inlet slit 10, the vacuum in the periphery of the cylindrical target 5 ultimately reaches approximately 1 Torr. The carrier speed of the substrate carrier system 6 is 600 mm/min when the substrate 7 has a 50 mm width, the film of $Al_2O_3$ has a 2 μm thickness, and the beam strength of the laser light is 2 $J/cm^2$. Since the substrate 7 is transported in the Y direction opposite to a Z direction of incidence of the laser light 2 as shown in FIG. 3, the substrate 7 eventually moves in the vacuum chamber 8 for a long time before the film is formed. Moreover, if the target 5 is separated 1 mm from the substrate 7 and the distance between the illuminating position of the laser light 2 on the target 5 and the substrate 7 is 5 mm, the film is formed immediately after the substrate 7 passes below the cylindrical target 5, whereby the quantity of oxygen introduced into the film is reduced. As a plume 14 generated when the laser light 2 is cast to the target 5 hits the substrate 7, crystallization of the compound is facilitated.

In the embodiment, the target 5 can be rotated by the driving motor 5a in a direction opposite to the above direction X, which is opposite to the direction Z in which the laser light 2 is cast. And the substrate carrier system 6 can be constructed so that each of the pair of chains 60 has only one chain element 60a having a plurality of claws for holding the substrate 7 on the chain element 60a, instead of holding the substrate 7 between the two chain elements 60a.

Figure 6:
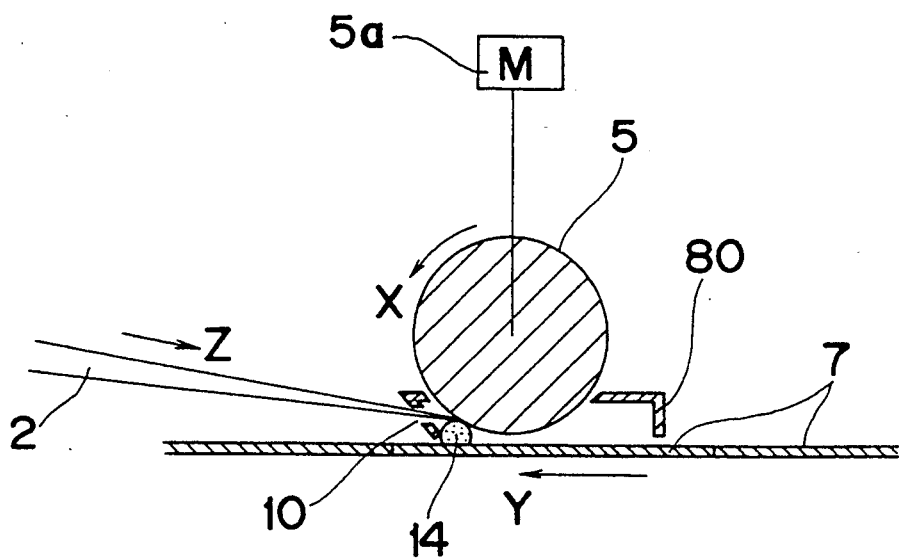
FIG. 6 is a sectional view of a laser ablation apparatus according to another embodiment of the present invention.
Figure 7:
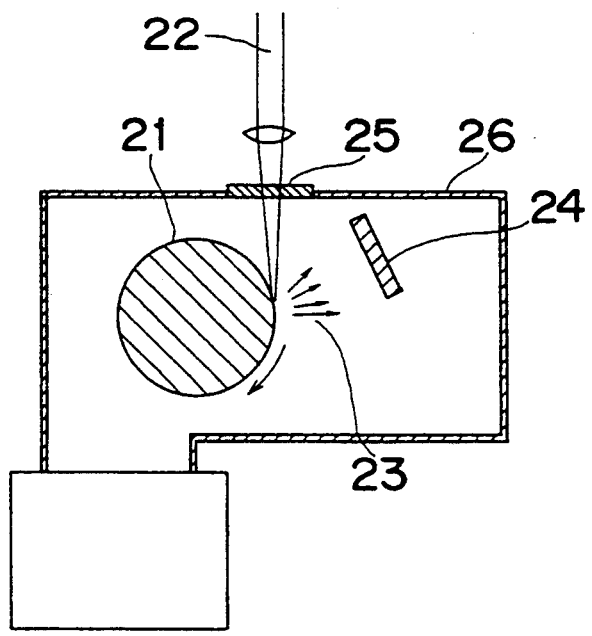
FIG. 7 is a sectional view of a conventional laser ablation apparatus.

Additionally, FIG. 6 shows another embodiment of the present invention wherein the vacuum chamber 8 covers only a lower part of the target 5 where the target 5 faces the substrate 7, and not the whole of the target 5 as shown in FIG. 3. Then, according to this embodiment, the size of the vacuum chamber 8 can be reduced to decrease the evacuating capacity of the oil diffusion pump 9.

According to the laser ablation apparatus of the embodiments, when the laser light is cast between the successively-fed substrate and the cylindrical rotary target enclosed by the vacuum chamber, the substrate can be sent continuously to a film forming region from atmospheric pressure, so that a thin film of a compound can be formed on the substrate with a high throughput without an inlet window being fogged.

In the above-described construction, a large-area substrate can be sent to an ablation region from atmospheric pressure, so that a high throughout film forming apparatus is achieved.

Although the present invention has been fully described in connection with the preferred embodiments thereof and with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser ablation apparatus comprising:
    a laser oscillator;
    a condenser lens for condensing a laser light generated from the oscillator;
    a rotary cylindrical target having a side face which is illuminated by the laser light;
    a driving device for rotating the cylindrical target;
    a substrate carrier device for moving a substrate in a direction parallel to a tangential direction of the cylindrical target; and
    a vacuum chamber located above the substrate, enclosing a part of the cylindrical target, and having an open laser inlet port so that the side face of the cylindrical target is illuminated by the laser light passing through the laser inlet port to adhere material evaporated from the cylindrical target to the substrate when the substrate passes through the vacuum chamber.

2. The laser ablation apparatus as claimed in claim 1, wherein the laser oscillator is a pulse laser.

3. The laser ablatlon apparatus as claimed in claim 1, and further comprising a mirror for reflecting the laser light from the lens toward the side face of the cylindrical target and a driving device for rotating the mirror to move the laser light in a direction of a rotary axis of the cylindrical target along a position of the side face of the target illuminated by the laser light.

4. The laser ablation apparatus as claimed in claim 1, wherein the substrate is moved by the substrate carrier device in a direction opposite to that in which the laser light is cast.

5. The laser ablation apparatus as claimed in claim 1, wherein the laser inlet port of the vacuum chamber is in the form of a slit.

* * * * *